United States Patent
Bruce et al.

(10) Patent No.: US 6,188,737 B1
(45) Date of Patent: Feb. 13, 2001

(54) METHOD AND APPARATUS FOR REGENERATING DATA

(75) Inventors: Paul A. Bruce, Hertfordshire (GB); Tom M. Luk, Ottawa (CA)

(73) Assignee: Nortel Networks Limited, Montreal (CA)

(*) Notice: Under 35 U.S.C. 154(b), the term of this patent shall be extended for 0 days.

(21) Appl. No.: 09/448,283

(22) Filed: Nov. 24, 1999

(51) Int. Cl.[7] .................................................... H04L 7/00
(52) U.S. Cl. ........................ 375/355; 375/214; 714/704
(58) Field of Search ................................ 375/355, 214; 714/704, 705

(56) References Cited

U.S. PATENT DOCUMENTS

| | | | |
|---|---|---|---|
| 4,823,360 | 4/1989 | Trembley et al. | 375/4 |
| 5,138,633 | * 8/1992 | Cortese | 375/355 |
| 5,333,147 | * 7/1994 | Nohara et al. | 375/224 |
| 5,736,875 | 4/1998 | Sakamoto et al. | 327/74 |
| 5,896,391 | 4/1999 | Solheim et al. | 371/5.1 |
| 5,896,392 | * 4/1999 | Ono et al. | 375/225 |

FOREIGN PATENT DOCUMENTS

WO 00/11830   3/2000 (WO) .............................. H04L/7/00

* cited by examiner

*Primary Examiner*—Don N. Vo
*Assistant Examiner*—Phuong Phu

(57) ABSTRACT

The invention provides a method and apparatus for efficiently regenerating an incoming data signal at a sampling point which is continually optimized independently of the regeneration process. While the incoming data signal is being regenerated in a regeneration unit, the invention uses a monitoring unit for concurrently optimizing the slicing threshold and sampling phase used in the regeneration unit without disturbing the on-going data regeneration. The invention uses a master-slave arrangement to regenerate the incoming data signal whereby the regenerating unit is updated with a new slicing threshold and sampling phase only after the new slicing threshold and sampling phase are fully optimized by the monitoring unit. In this way, the data regeneration can proceed unaffected by the optimization of the slicing threshold and sampling phase which, as a result can be continuously optimized without inducing any errors into the regenerated data.

34 Claims, 7 Drawing Sheets

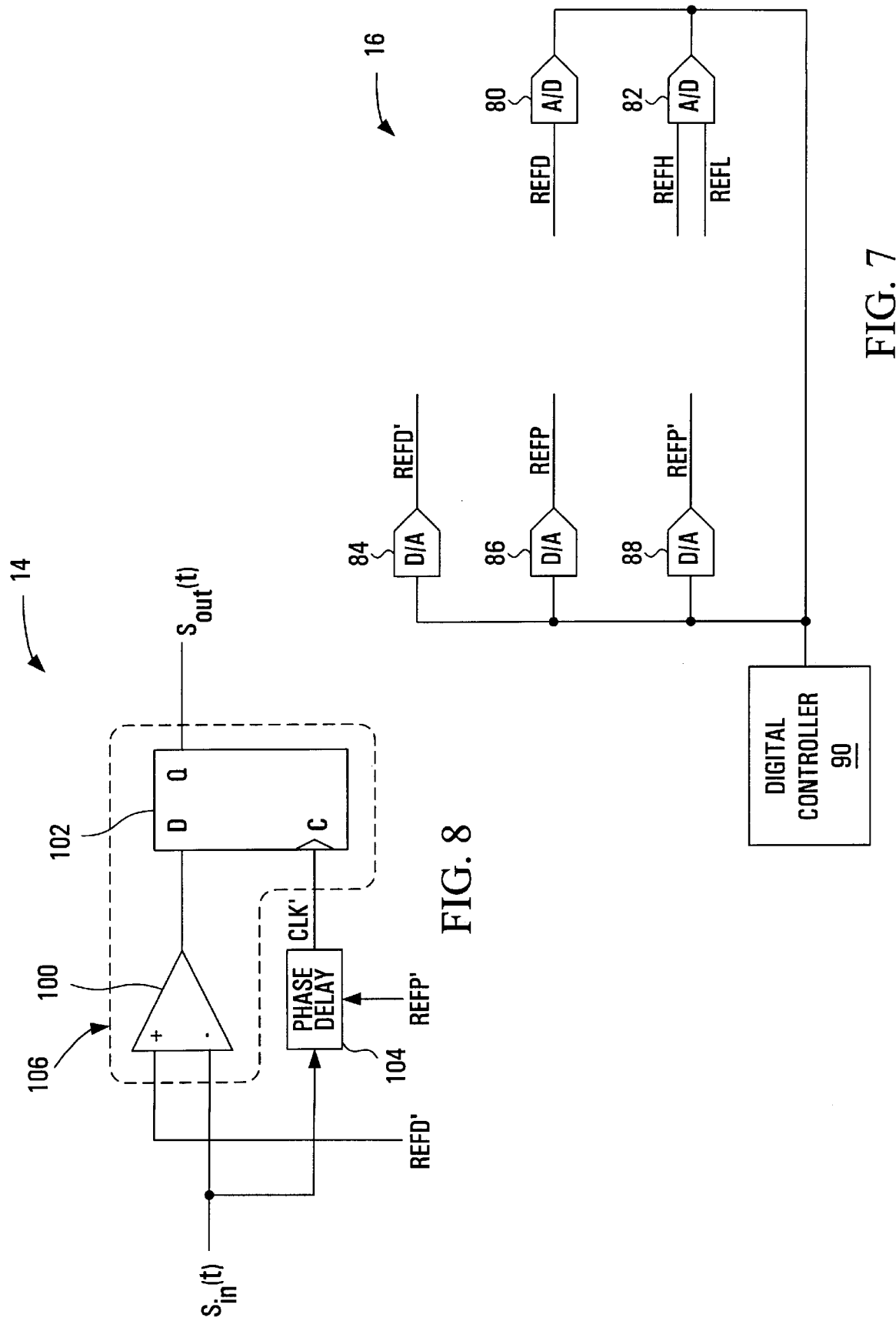

METHOD AND APPARATUS FOR REGENERATING DATA

FIELD OF THE INVENTION

The present invention is directed to data regeneration and more particularly to a method and apparatus for regenerating data signals optimally.

BACKGROUND OF THE INVENTION

In a typical communication network, information is transported between network terminals by interconnecting links such as twisted pair metallic conductors, coaxial cables, fibre-optic cables, radio frequency wireless channels or over the air infra-red channels. The maximum distance over which information can be reliably transmitted in a network is mainly dictated by the type of interconnecting links used but is also dependent upon other factors such as the transmit power launched, transmission losses and the sensitivity of optical receivers used in the network terminals.

Where the distance between desired end points of a transmission exceeds the maximum distance over which information can be reliably transmitted, transit terminals such as repeaters and amplifiers are commonly used along the transmission path for signal amplification and regeneration.

Any data transmission between a transmitter and a receiver in a communication network is subject to unpredictable errors caused by signal degradation. It is well known that signals suffer degradation from a variety of sources such as, for example, noise, inter-symbol interference and distortion which are related to the nature of the transmission medium used. Signals may also be corrupted along the transmission path as a result of sampling and quantization. The degradation of a signal is expressed as a bit error rate (BER) which is the ratio between the number of erroneous bits counted at a particular point of interest in the network over the total number of bits received.

The extent of degradation of a particular signal may be directly measured using an eye closure diagram, which is the graphic pattern produced on an oscilloscope by the signal symbols superimposed over a single symbol interval. For a binary signal, such an eye diagram has a single eye which is open or closed to an extent determined by the signal degradation.

An eye closure diagram is useful for evaluating the transmission performance of a particular transmission link and can be used in a receiver for regenerating data. As is well known, the ability of a receiver to regenerate data received from a particular transmission link is dependent upon a threshold level or slicing threshold and a sampling phase. By monitoring the eye closure of the incoming signal, the optimum slicing threshold and sampling phase for the receiver can be determined more easily.

U.S. Pat. No. 4,823,360 entitled "Binary data regenerator with adaptive threshold level" which issued on Apr. 18, 1989 to Tremblay et al. (hereinafter referred to the "360 patent"), discloses a data regenerator which dynamically monitors the eye closure of an incoming data signal for regeneration. In order to monitor the data signal eye closure, the data regenerator disclosed in the 360 patent uses two slicing thresholds within the data eye (hereinafter referred to as "reference slicing thresholds") for producing "pseudo-errors" at a preset BER on binary ones and zeros of the data signal. The pseudo-errors do not appear on the in-service data path and as a result, do not affect the data regeneration. The thresholds are dynamically adjusted so that the number of pseudo-errors generated on binary ones and zeros is maintained to correspond to the preset BER. On the in-service data path, the data regenerator operates to set a third slicing threshold level (hereinafter the "data slicing threshold") optimally within the data eye in relation to the reference slicing thresholds and move the placement of this threshold as a function of time within the eye to produce an optimum slicing level at an optimum sampling phase. The technique disclosed in the 360 patent provides some measure of the transmission link performance as a function of slicing level and sampling phase and is particularly useful to regenerate incoming data with an optimally placed slicing threshold.

However, a disadvantage of this approach is that the optimization of the data slicing threshold and sampling phase is carried out on the in-service data path while the incoming data is being regenerated. By optimizing the data slicing threshold and sampling phase on the in-service data path, errors can be introduced in the data signal thereby effectively increasing the BER of the transmission system and reducing performance. For low bit rate signals where the optimum sampling phase can be located near an edge of the data eye, this can lead to a failure of the data path.

Another data regenerator which optimizes the data slicing threshold and sampling phase on the in-service data path during data regeneration is disclosed in U.S. Pat. No. 5,896,391 entitled "Forward error correction assisted receiver optimization" which issued on Apr. 20, 1999 to Solheim, et al. (hereinafter referred to the "391 patent"). Instead of using reference slicing thresholds and pseudo-errors to monitor the eye closure of the incoming signal and optimize the slicing threshold and sampling phase, the data regenerator disclosed in the 391 patent prepares BER maps of the incoming data signal based on actual errors present in the incoming data signal as they are detected by error detection circuitry.

It is well known that errors present in an incoming data signal transmitted over a transmission link may be detected (and corrected) at a receiver by using error correction codes such as a forward error correction (FEC) codes. The error correction codes are typically embedded in the data signal at the transmitting site before transmission. At the receiver, the errors present in the regenerated data signal can be detected and corrected by comparing the codes received with the known codes transmitted.

Monitoring the eye closure of an incoming data signal based on actual errors detected in the regenerated data signal such as is disclosed in the 391 patent might be appropriate in proprietary systems where error detection techniques are already used. However, this technique would not be appropriate in systems which do not use any error detection techniques. This would certainly be true of low data rate systems in the order of 2.5 Gb/s where error detection is not required. Further, as there is presently a strong push for protocol and bit-rate independent systems, it would be desirable to be able to monitor the eye closure for data regeneration independently of any proprietary information.

The operation of the data regenerator disclosed in the 391 patent is divided into an error mapping mode, an optimization mode and a data regeneration mode. More specifically, the data regenerator functions in the error mapping mode to monitor the eye closure by preparing a BER map of the incoming data signal. The data generator can also operate in the optimization mode to determine based on the BER map prepared, an optimum data slicing threshold and sampling phase placement within the data eye. With the slicing threshold and sampling phase optimized, the data regenerator can operate in a data regeneration mode to regenerate the incoming data signal.

Although the data regenerator disclosed by the 391 patent operates in separate modes for BER mapping, optimization of the slicing threshold and sampling phase, and data regeneration, actual errors are nevertheless generated on the in-service data path during the BER mapping and optimization process. The data regenerator disclosed therein would be appropriate for proprietary data signals with proprietary data rates which do not require frequent BER mapping and optimization updates as the eye closure in such cases remains essentially the same.

However, in situations where the eye closure continuously changes requiring frequent BER map and optimization updates, the data regenerator may introduce a substantial number of errors in the regenerated data signal which may not be all correctable by standard error correction techniques. This would occur for example where the transmission link is used for data signals operating at different bit rates or operating with different transmission protocols. Again, as network technology evolves toward multi rate and protocol independent systems, it would be desirable for data regeneration to be able to continuously monitor the eye closure independently of any rate or protocol change without introducing any errors into the regenerated data.

SUMMARY OF THE INVENTION

The present invention addresses these issues and to this end provides a methodology and apparatus to mitigate the present limitations in this art.

The invention provides a method and apparatus for efficiently regenerating an incoming data signal at a sampling point which is continually optimized independently of the regeneration process. While the incoming data signal is being regenerated in a regeneration unit, the invention uses a monitoring unit for concurrently optimizing the slicing threshold and sampling phase used in the regeneration unit without disturbing the on-going data regeneration.

The invention uses a master-slave arrangement to regenerate the incoming data signal whereby the regenerating unit is updated with a new slicing threshold and sampling phase only after the new slicing threshold and sampling phase are fully optimized by the monitoring unit. In this way, the data regeneration can proceed unaffected by the optimization of the slicing threshold and sampling phase which, as a result can be continuously optimized without inducing any errors into the regenerated data.

According to a preferred embodiment, the invention is embodied in a data regenerator which has a regenerating unit for regenerating the incoming signal, a monitoring unit for optimizing the slicing threshold and the sampling phase, and a control unit for controlling the data regeneration and the optimization in a master-slave arrangement. In order to optimize the slicing threshold and sampling phase, the monitoring unit monitors the incoming signal eye closure for evaluating transmission performance and determining an optimum slicing threshold and sampling phase within the eye closure.

While the incoming data signal is being regenerated, the monitoring unit performs eye measurements on the incoming data signal which are then forwarded to the control unit where they are processed to obtain bit error rate (BER) contours and establish a BER map of the eye closure. Based on this BER map, the control unit can determine whether the existing sampling point used in the regenerating unit is optimally placed within the eye closure or whether it needs to be updated. If an update is necessary to maintain the data regeneration optimum, the control unit uses the BER map to determine a new slicing threshold and sampling phase. Once determined, the new slicing threshold and sampling phase are then forwarded to the regenerating unit which as a result operates to regenerate the incoming data signal at the optimized sampling point until further optimization is carried out.

Advantageously, by using separate circuitry for data regeneration and optimization, the data regeneration is not disturbed by the optimization of the slicing threshold and sampling phase. Because the optimization process does not affect data regeneration, the present invention does not introduce errors into the regenerated data. As such, the invention is particularly well suited for protocol independent data regenerators where the eye closure continuously changes requiring frequent BER map and optimization updates.

By comparison with conventional data regenerating techniques, another advantage of the present invention is that the signal eye closure can be monitored independently of any proprietary information or protocols.

In addition to optimally adjusting the slicing threshold and sampling phase used for regenerating data, the invention can also advantageously be used for adjusting other parameters such as detector bias and equalizer tuning for optimum performance.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

FIG. 7 is a block diagram of the control unit of FIG. 2 according to the preferred embodiment of the invention; and FIG. 8 is a block diagram of the regenerating unit of FIG. 2 according to the preferred embodiment of the invention.

DETAILED DESCRIPTION OF THE PREFERRED EMBODIMENTS

The invention provides a method and apparatus for efficiently regenerating an incoming data signal at a sampling point which is continually optimized independently of the regeneration process. While the incoming data signal is being regenerated in a regeneration unit, the invention uses a monitoring unit for concurrently optimizing the slicing threshold and sampling phase used in the regeneration unit without disturbing the on-going data regeneration.

The invention uses a master-slave arrangement to regenerate the incoming data signal whereby the regenerating unit is updated with a new slicing threshold and sampling phase only after the new slicing threshold and sampling phase are fully optimized by the monitoring unit. In this way, the data regeneration can proceed unaffected by the optimization of the slicing threshold and sampling phase which, as a result can be continuously optimized without inducing any errors into the regenerated data.

Figure 1:
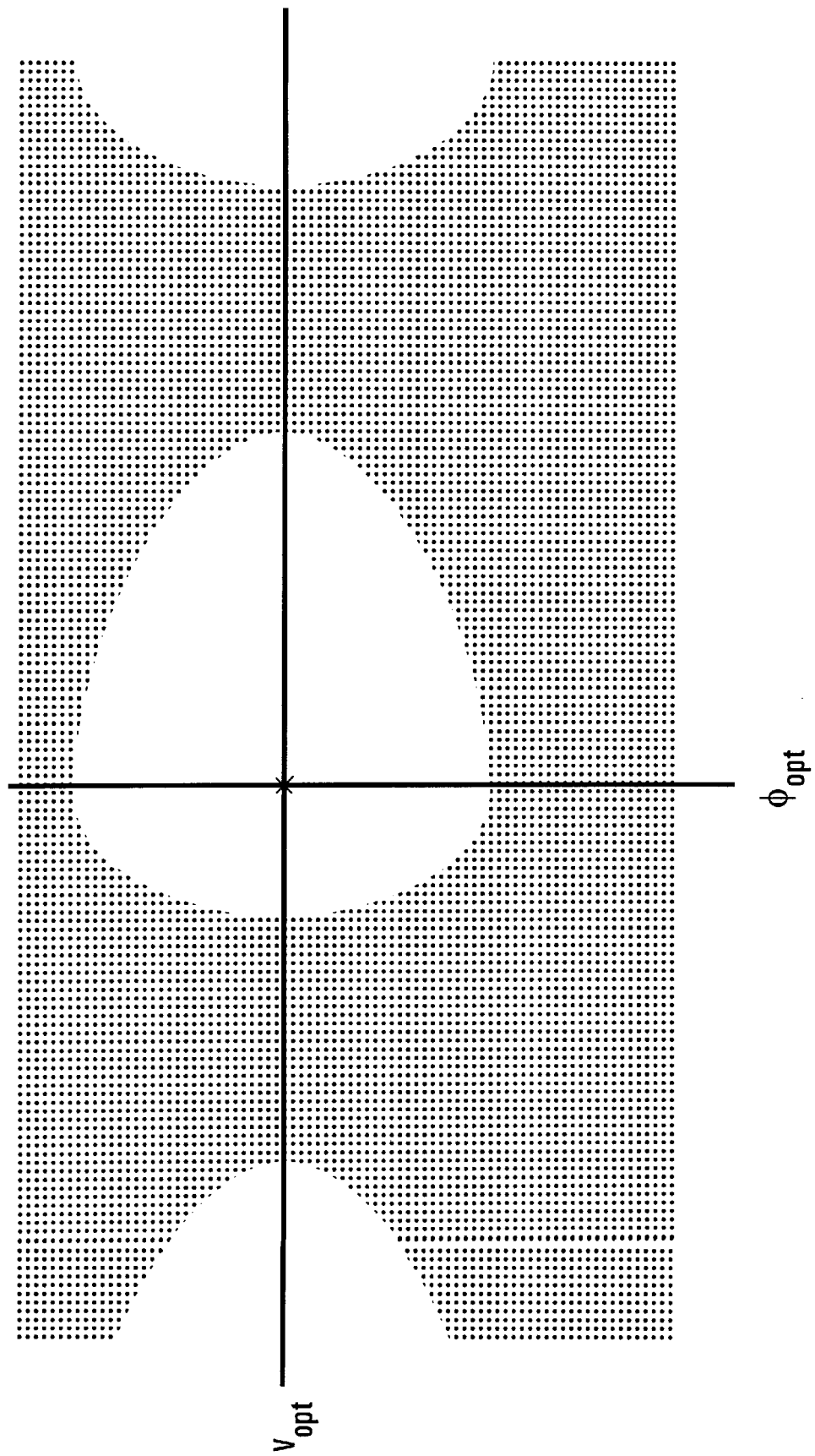
FIG. 1 is a typical eye closure diagram of a data signal.

The invention uses an eye closure diagram for evaluating the performance of the transmission link and determining an optimum slicing threshold and sampling phase within the eye closure. FIG. 1 is a typical eye closure diagram of an incoming data signal received over a transmission link illustrating a slicing threshold $V_{opt}$ and a sampling phase $\phi_{opt}$ optimally placed within the eye closure for optimum regeneration of the data received. The vertical coordinate of the eye closure diagram represents the voltage (power) amplitude of the received signal and the horizontal coordinate represents time. According to invention, the eye closure of the incoming data signal must be continuously monitored to update the slicing threshold and sampling phase whenever necessary so that the incoming data signal can be optimally regenerated.

Figure 2:
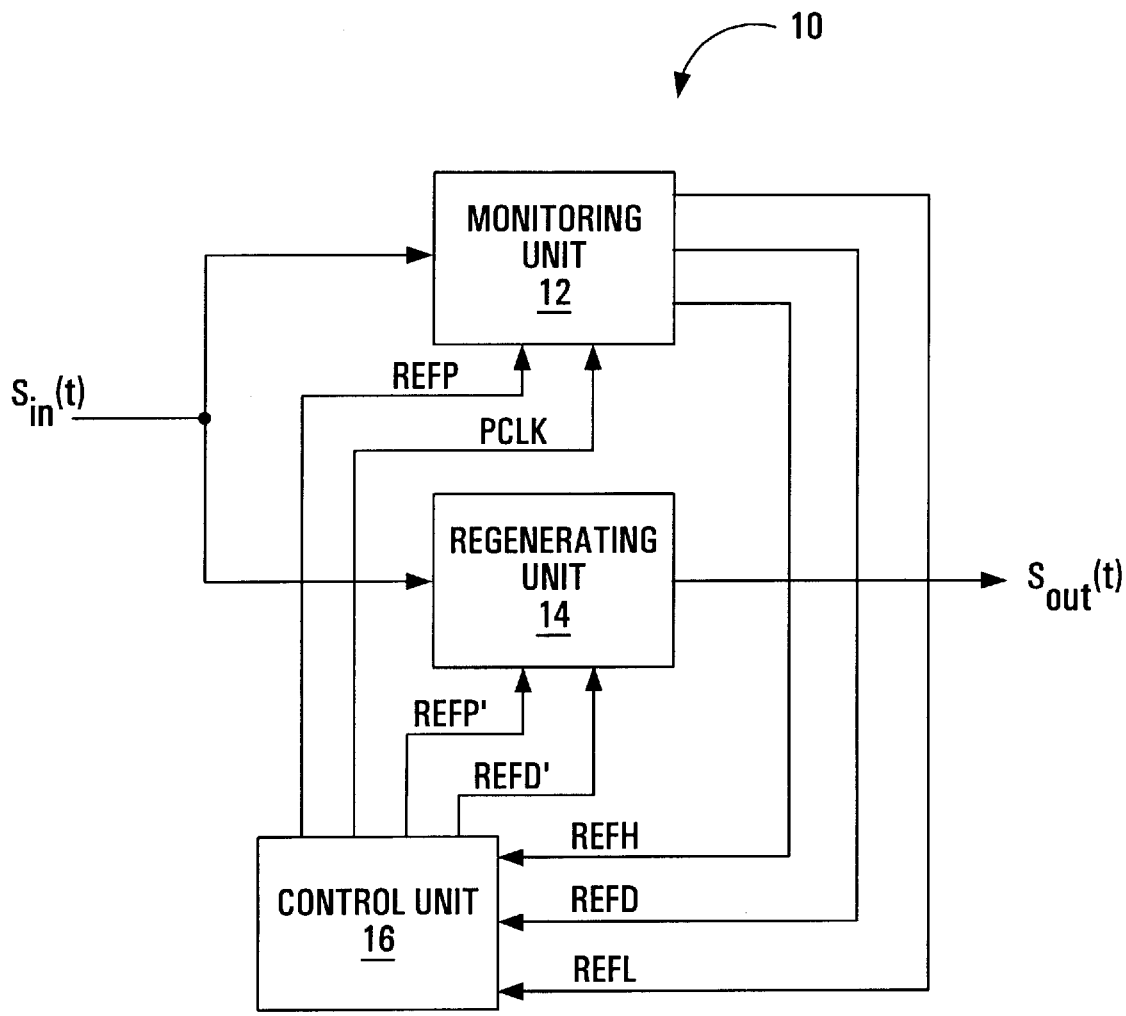
FIG. 2 is a block diagram of a data regenerator used for regenerating an incoming data signal according to a preferred embodiment of the invention.

In order to continuously monitor the data signal eye closure without disturbing the data signal being regenerated, the invention uses separate circuitry for monitoring the data eye closure and regenerating the data signal. FIG. 2 shows a data regenerator 10 according to a preferred embodiment of the invention that uses different circuits for eye monitoring and data regeneration of an incoming signal $S_{in}(t)$.

The data regenerator 10 of this embodiment has a monitoring unit 12 and a regenerating unit 14 interconnected with a control unit 16. The monitoring unit 12 is responsible to perform eye measurements on the incoming data signal $S_{in}(t)$. The monitoring unit 12 is coupled to receive the incoming data signal $S_{in}(t)$ in transmission together with a reference phase (REFP) signal and a clock signal PCLK from the control unit 16. The monitoring unit 12 produces three reference level signals, a reference high REFH, a reference low REFL and a reference data REFD which, together with the REFP reference and the PCLK signal, are used internally to perform eye measurements (further details below). The REFH, REFL and REFD references are also coupled externally to the control unit 16. Based on these references REFH, REFL, REFD, the control unit 16 produces a reference data REFD' and a reference phase REFP' to the regenerating unit 14. The regenerating unit 14 is coupled to receive the incoming data signal $S_{in}(t)$ and uses the reference data REFD' as a slicing threshold and the reference phase REFP'as a sampling phase to optimally produce a regenerated output data signal $S_{out}(t)$.

The invention uses a master-slave arrangement to regenerate the incoming data signal $S_{in}(t)$ whereby the regenerating unit 14 is updated with a new slicing threshold and sampling phase only after the new slicing threshold and sampling phase are fully optimized by the monitoring unit 14. In this way, the data regeneration can proceed unaffected by the optimization of the slicing threshold and sampling phase which, as a result can be continuously optimized without inducing any errors into the regenerated data.

With the REFD' and REFP' references produced by the control unit 16 and not directly by the monitoring unit 12, the regenerating unit 14 can regenerate the incoming data $S_{in}(t)$ without any disruption from the monitoring process. While the incoming data signal $S_{in}(t)$ is regenerated, the monitoring unit 12 concurrently performs eye measurements on the incoming signal $S_{in}(t)$ to detect any changes in the eye closure. According to the invention, measurements of the signal eye closure are continuously taken by the monitoring unit 12 to optimize the REFD' and REFP' references whenever necessary so that the incoming data signal $S_{in}(t)$ can be continuously regenerated at an optimum sampling point within the eye.

The eye measurements taken in the monitoring unit 12 are forwarded to the control unit 16 via the reference levels REFH, REFL and REFD. In the control unit 16, the eye measurements received are processed to obtain bit error rate (BER) contours and establish a BER map of the eye closure. Based on this BER map, the control unit 16 can determine whether the existing sampling point used in the regenerating unit 14 is optimally placed within the eye closure or whether it needs to be updated. An update would be required where, for example, the eye closure changes shape due to variations of the data signal bit rate or variations of the transmission conditions. By continuously taking measurements in the monitoring unit 12, any change in the data eye closure will be detected. When a change in the eye closure occurs, the control unit 16 uses the eye measurements obtained from the monitoring unit 12 to determine a new slicing threshold and sampling phase which accounts for the eye closure variation detected. When the new slicing threshold and sampling phase have been determined, the control unit 16 updates the REFD' and REFP' references to reflect the change. Following the update, the regenerating unit 14 operates to regenerate the incoming data signal $S_{in}(t)$ at the optimized sampling point denoted by REFD' and REFP' until further optimization is carried out.

Figure 3:
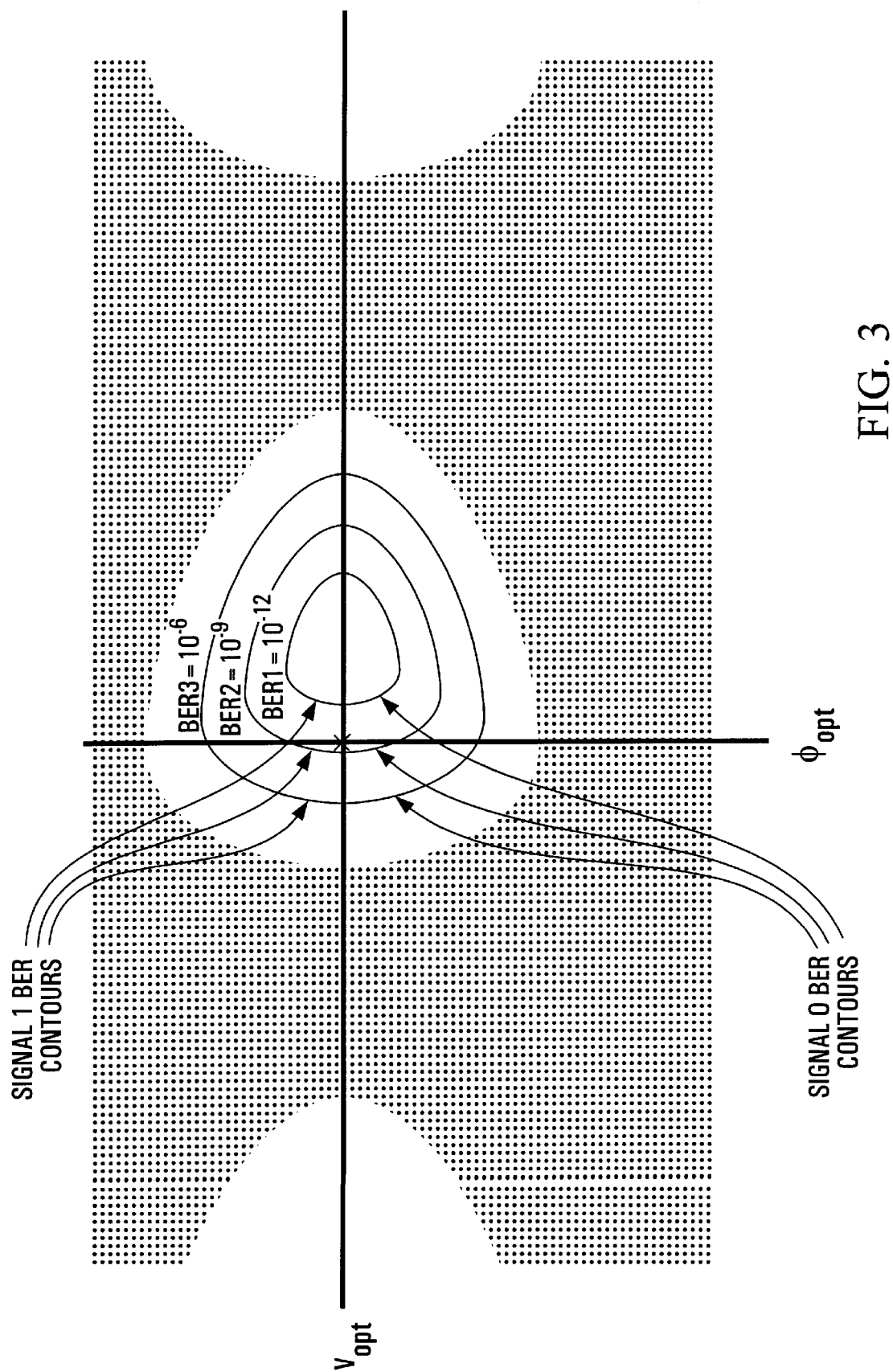
FIG. 3 shows an eye closure diagram for the incoming data signal with BER contours.

To further illustrate this, reference is now made to FIG. 3 where an eye closure diagram for the incoming data signal $S_{in}(t)$ is shown with three BER contours denoted by BER1, BER2 and BER3. Each BER contour BER1, BER2, BER3 is formed of a signal one BER contour and a signal zero BER contour and are each associated to a particular BER. In this example, contour BER1 (signal one and zero BER contours) corresponds to a BER of $10^{-12}$, while contour BER2 (signal one and zero BER contours) corresponds to a higher BER of $10^{-9}$, and contour BER3 (signal one and zero BER contours) to a BER of $10^{-6}$. From these contours BER1, BER2, BER3, the control unit 16 can determine whether the existing sampling point (defined by REFD' and REFP') used in the regenerating unit 14 is optimally placed within the eye closure or whether optimization is required.

Each BER contour is obtained by varying the reference phase REFP in the control unit 16 and taking BER measurements of the incoming signal $S_{in}(t)$ in the monitoring unit 12 for each reference phase REFP. In order to measure a particular BER for a particular reference phase REFP, the monitoring unit 12 uses the REFH and REFL references as slicing thresholds to generate pseudo-errors on binary ones and zeros of the incoming signal $S_{in}(t)$. With the REFH threshold, pseudo-errors are generated on binary ones of the incoming data signal $S_{in}(t)$. Similarly, with the REFL threshold, pseudo-errors are generated on binary zeros of the incoming signal $S_{in}(t)$. As will be explained below in further detail, the REFH and REFL references are feedback adjusted based on the number of pseudo-errors generated until the predetermined BER is obtained. The adjusted REFH and REFL references are then recorded in the control unit 16 to denote the predetermined BER within the eye closure at the particular reference phase REFP. By varying the reference phase REFP and establish the adjusted REFH and REFL references to correspond to the predetermined BER, a BER contour can be obtained. The process is repeated for assessing additional BER contours and obtain a BER map of the entire data eye closure.

According to the preferred embodiment of the invention, the monitoring unit 12 described above for monitoring the incoming data eye closure is implemented based on the data regenerator architecture disclosed in U.S. Pat. No. 4,823,360 entitled "Binary data regenerator with adaptive threshold level"which issued on Apr. 18, 1989 to Tremblay et al. (hereinafter referred to the "360 patent"). The following section will now describe in detail the architecture and operation of the monitoring unit 12. For any further information, reference may be made to the 360 patent the disclosure of which is incorporated herein by reference.

Figure 4:
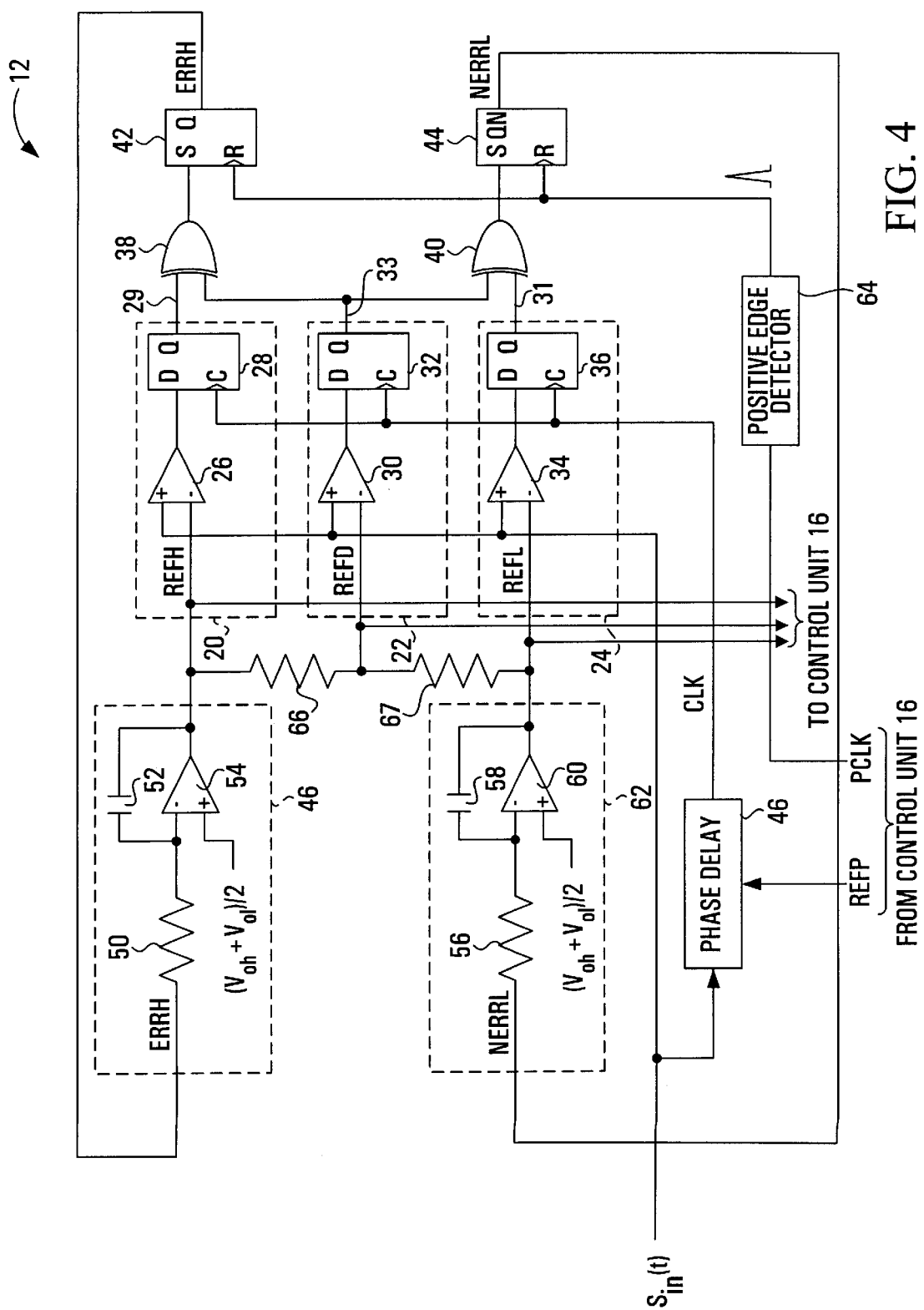
FIG. 4 is a block diagram of the monitoring unit of FIG. 2 according to the preferred embodiment of the invention.

FIG. 4 shows as an example, a more detailed diagram of the monitoring unit 12 based on the data regenerator architecture disclosed in the 360 patent. In this particular implementation, three pseudo channels generally indicated by 20, 22 and 24 are used for assessing BER contours of the incoming data eye closure. A first pseudo channel 20 (hereinafter also referred to as the "upper pseudo channel") is used for generating pseudo-errors on binary ones of the incoming data signal $S_{in}(t)$ at various BERs so that different signal one BER contours can be assessed. A second pseudo channel 24 (hereinafter also referred to as the "lower pseudo channel") is used for generating pseudo-errors on binary zeros on the incoming data signal $S_{in}(t)$ at various BERs so that multiple signal zero BER contours can be obtained. In addition to the upper and lower pseudo channels 20, 24 a third channel generally indicated by 22 (hereinafter also referred to as the "reference channel") is used to provide a center reference for the BER measurements in the other upper and lower pseudo channels 20, 24 (further details below).

The upper and lower pseudo channels 20, 24 each consists of a differential amplifier 26, 34 connected in series with a D-type flip-flop 28, 36. The differential amplifiers 26, 34 are coupled to receive the incoming data signal $S_{in}(t)$ in a non-inverting (+) input. In an inverting (−) input, the differential amplifier 26 is coupled to receive the REFH reference and produces its output to a data input D of the flip-flop 28. Similarly, the differential amplifier 34 is coupled in an inverting input to receive the REFL reference for producing its output to a data input D of the flip-flop 36.

The flip-flops 28, 36 are each clocked with a sampling clock signal CLK derived from the incoming signal $S_{in}(t)$ through a phase delay 62. More specifically, the sampling clock signal CLK is obtained in the phase delay 62 by recovering a clock signal from the incoming signal $S_{in}(t)$ and adjusting the phase of the recovered clock with the REFP reference. The phase delay 62 displaces the recovered clock pulses according to the REFP reference phase produced by the control unit 16. The sampling clock CLK is fed into the flip-flops 28, 36 which as a result, produce in a Q output a respective pseudo data channel signal 29, 31. The pseudo output data signals 29, 31 produced by the upper and lower pseudo channels 20, 24 can be viewed as pseudo regenerated data signals respectively produced in relation to the reference thresholds REFH and REFL.

Similarly to the upper and lower pseudo channels 20, 24, the reference channel 22 is comprised of a differential amplifier 30 and a D-type flip-flop 32. The differential amplifier 30 is coupled to receive the incoming data signal $S_{in}(t)$ in a non-inverting (+) input and the REFD reference in an inverting input (−) for producing an output to the associated flip-flop 32 via a data input D. The flip-flop 32 is also coupled to receive in a clock input C the sampling clock signal CLK derived from the incoming signal $S_{in}(t)$ through the phase delay 62 for producing a reference data signal 33 in a Q output. Similarly to the pseudo output data signals 29, 31 produced by the upper and lower pseudo channels 20, 24, the reference data signal 33 produced by the reference channel 22 can be viewed as a pseudo regenerated data signal produced in relation to the reference threshold REFD.

Each pseudo output data signals 29, 31 is coupled to a control loop formed of an exclusive-OR gate 38, 40, a pulse stretching unit 42, 44 and an inverting integrator generally indicated by 46, 48 for producing the REFH and REFL references respectively. More specifically, the pseudo output data signals 29, 31 are respectively gated to the exclusive-OR gates 38, 40 with the reference data signal 33 produced by the reference channel 22. As a result, the gates 28, 40 produce a logic one output whenever regenerated data at the output of the respective pseudo channels 20, 24 is in error relative to the regenerated data at the output of the reference channel 22. By operation of these gates 38, 40, pseudo-errors produced in the pseudo channels 20, 24 on binary ones and zeros of the incoming data signal $S_{in}(t)$ can be detected.

The outputs of the gates 38, 40 are respectively coupled to the pulse stretching units 42, 44 to stretch the pseudo-errors detected. According to the invention, various components can be used to implement this pulse stretching function such as, for example, flip-flops or digital counters. FIG. 4 shows as an example the pulse stretching units 42, 44 each implemented with a respective set-reset flip-flop.

The pulse stretching units 42, 44 are also connected to receive in a respective R input, the clock signal PCLK provided by the control unit 16 through a positive edge detector 64. The control unit 16 produces the PCLK signal at a variable frequency which is typically much lower than the frequency of the sampling clock signal CLK. As will be described below in further detail, the PCLK signal acts as a reset clock. As a result, the pulse stretching unit 42 produces in a Q output an output signal ERRH formed of stretched binary one pseudo errors which is reset at the PCLK rate. Similarly, the pulse stretching unit 44 produces in a QN output an output signal NERRL formed of stretched binary zero pseudo errors which is also reset at the PCLK rate.

The output signals ERRH and NERRL are each defined with a low logic level $V_{ol}$ and a high logic level $V_{oh}$. These output signals ERRDH and ERRDL are respectively fed into the inverting integrators 46, 48. The inverting integrators 46, 48 are each formed of a series resistor 50, 56, a differential amplifier 54, 60 and a feedback capacitor 52, 58. In this particular embodiment, the inverting integrators 46, 48 are referenced to a predetermined direct current (DC) offset $(V_{ol}+V_{oh})/2$ via a non-inverting input (further details below) and respectively operate to produce the REFH and REFL references. The REFH and REFL references are supplied to a voltage divider formed of two resistors 66, 67 to produce at its tapping point the REFD reference which is used in the reference channel 22.

In order to assess signal one and signal zero BER contours of the incoming data eye closure, the monitoring unit 12 takes BER measurements of the incoming signal $S_{in}(t)$ for different reference phases REFP. As noted above, in order to measure a particular BER for a particular reference phase REFP, the monitoring unit 12 uses the REFH and REFL references as slicing thresholds in the upper and lower pseudo-channels 20, 24 to generate pseudo-errors on binary ones and zeros of the incoming signal $S_{in}(t)$.

The pseudo-errors generated in the upper and lower pseudo-channels 20, 24 are produced in reference to the reference data signal 33. More specifically, a pseudo-error on binary ones of the incoming signal $S_{in}(t)$ will be produced whenever regenerated data at the output of the upper pseudo channel 20 is in error relative to the regenerated data at the output of the reference channel 22. Similarly, a pseudo-error on binary zeros of the incoming signal $S_{in}(t)$ will be produced whenever regenerated data at the output of the lower pseudo-channel 24 is in error relative to the regenerated data at the output of the reference channel 22.

The reference channel 22 uses the REFD reference as a slicing threshold to provide a center reference for the generation of pseudo-errors in the upper and lower pseudo channels 20, 24. According to the invention, the REFD reference is set by the voltage divider 66 to an optimal value between the REFH and REFL references with a predetermined ratio thereto. According to the invention, the manner in which the REFD reference is derived from the REFH and REFL references is not unique. For the purpose of example, the REFD reference could be derived from the REFH and REFL references using the following expression:

$$REFD = REFL + K * (REFH - REFL)$$

where K is a positive fraction chosen so that REFD is optimally placed between REFH and REFL. As typically the error density for binary ones is greater than that for binary zeros, the value of K would be typically less than 0.5 and could be for example in the range from 0.3 to 0.5.

For each particular BER measurement, the REFH and REFL references are feedback adjusted until the upper and lower pseudo-channels generate pseudo-errors at a predetermined BER. The adjusted REFH and REFL references are then recorded in the control unit 16 to denote the predetermined BER within the eye closure.

The manner in which a particular BER is predetermined and the REFH and REFL references adjusted is identical for both the upper and lower pseudo-channels 20, 24 and will now be described only in reference to the upper pseudo-channel 20. To begin however, the operation of the integrator 46 and the upper pseudo-channel for producing pseudo-errors at a predetermined BER is described as this is required for an understanding of the method by which BERs are predetermined and the REFH and REFL references adjusted.

In order for the upper pseudo-channel 20 to produce pseudo-errors on binary ones of the incoming signal $S_{in}(t)$ at a predetermined BER, the pulse stretching unit 42 produces the ERRH signal at a predetermined mean duty cycle so that the REFH reference can be maintained at the appropriate slicing level. To maintain the generation of pseudo-errors fixed at the predetermined BER, the integrator 46 continually forces the ERRH mean duty cycle to its predetermined value. If the ERRH mean duty cycle changes, the integrator 46 immediately counteracts by appropriately adjusting the REFH reference level to force a corresponding change in the number of pseudo-errors generated such that the ERRH mean duty cycle is maintained constant.

As will be explained below in further detail, the number of pseudo-errors produced in the upper pseudo-channel 20 is closely related to the duty cycle of the ERRH signal. For example, if the number of pseudo-errors generated increases, the ERRH duty cycle increases. Conversely, if the number of pseudo-errors generated decreases, the ERRH duty cycle decreases.

If the REFH reference is set too high for the predetermined BER, the upper pseudo-channel 20 will generate too many pseudo-errors and as a result, the ERRH duty cycle will increase causing the integrator 46 to immediately decrease the REFH reference. If the REFH reference is set too low, not enough pseudo-errors are generated and as a result, the ERRH duty cycle decreases causing the integrator 46 to increase the REFH reference. This negative feedback maintains the REFH reference to a level that allows the upper pseudo-channel 20 to produce pseudo-errors at the predetermined BER.

The integrator's responsiveness to changes in the ERRH mean duty cycle is based on resulting changes induced in the ERRH direct current (DC) level. To keep the ERRH mean duty cycle constant and maintain the generation of pseudo-errors at the predetermined BER, the integrator 46 forces the ERRH DC level to be equal to the integrator DC offset. Any change in the ERRH duty cycle causes a corresponding change in the ERRH DC level which in turn causes the integrator 46 to adjust the REFH reference until the ERRH DC level is equal again to the integrator DC offset. As a result, the REFH reference is always adjusted to a level that maintains the ERRH DC level equal to the integrator DC offset. In the preferred embodiment of FIG. 4, the integrator DC offset is set to $(V_{ol}+V_{oh})/2$ which forces the ERRH DC level to be $(V_{ol}+V_{oh})/2$. By forcing the ERRH DC level to $(V_{ol}+V_{oh})/2$, the integrator 46 maintains the ERRH mean duty cycle to a constant value of 50 percent. Any change in the ERRH duty cycle causes a corresponding change in the ERRH DC level which in turn causes the integrator 46 to adjust the REFH reference until the ERRH DC level is equal again to the DC offset of $(V_{ol}+V_{oh})/2$.

Figure 5:
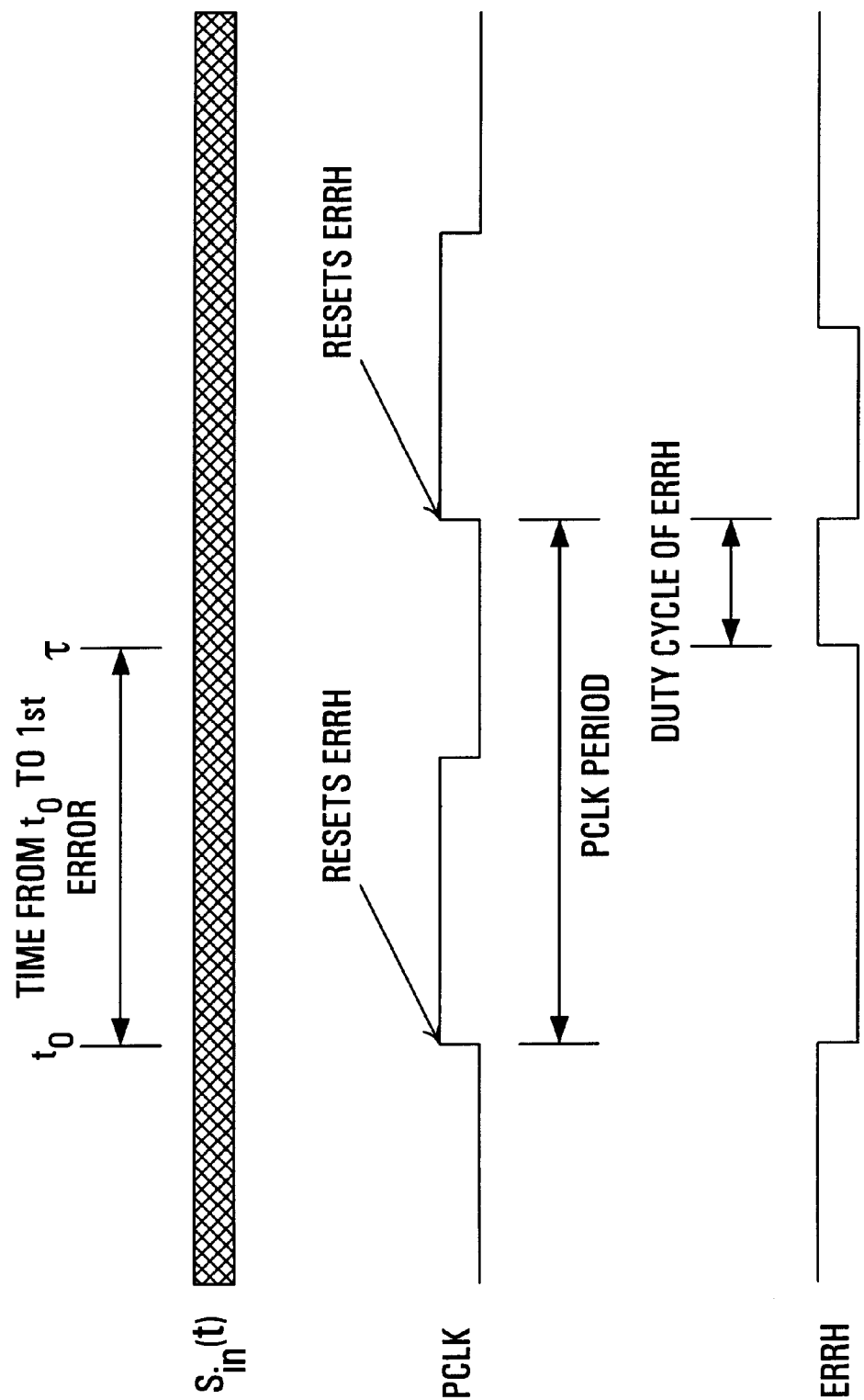
FIG. 5 is a timing diagram of electrical signals received and produced by the monitoring unit of FIG. 4.

To further illustrate how the number of pseudo-errors generated by the upper pseudo-channel 20 affects the ERRH duty cycle, reference is now made to FIG. 5. In this figure, there is shown a timing diagram of the incoming signal $S_{in}(t)$, the PCLK signal and the resulting ERRH signal produced by the pulse stretching unit 42. During each period T of the PCLK signal, the ERRH signal is set at the occurrence of a first pseudo-error detected by the gate 38 and reset at the start of the next PCLK rising edge. FIG. 5 shows the ERRH signal set at a random time τ after the occurrence of a preceding PCLK rising edge defined to occur at time $t_0$. Relative to $t_0$, the ERRH duty cycle extends from τ where a first pseudo-error is detected to the time at which the next PCLK rising edge occurs to reset ERRH.

It can be observed that the ERRH duty cycle is a function of both the time T and the PCLK period T. For a constant PCLK period T, if the time τ is short, the ERRH duty cycle will be large. Conversely, if the time τ is long, the ERRH duty cycle will be shorter. Because of this dependence, the number of pseudo-errors generated in the upper pseudo-channel 20 has a direct impact on the mean duty cycle of the ERRH signal. If the upper pseudo-channel 20 is producing pseudo-errors at a predetermined BER (determined by the PCLK period T), any deviation in the ERRH mean duty cycle will cause the integrator 46 to immediately adjust the REFH reference so that the predetermined BER is maintained.

In order to predetermine a particular BER in the upper pseudo-channel 20, the control unit 16 introduces a change in the ERRH duty cycle by varying the PCLK period T. The duty cycle change triggers the integrator 46 to adjust the REFH reference to a level that causes the ERRH mean duty cycle to be forced back to its predetermined value. In the example given above, the REFH reference would be adjusted such that the ERRH mean duty cycle would be forced back to 50%. In terms of ERRH DC level, the integrator 46 would adjust the REFH reference to a level that causes the ERRH DC level to be forced back to $(V_{ol}+V_{oh})/2$.

As will be explained below in further detail, by varying the period T of the PCLK signal and adjusting the REFH reference such that the ERRH mean duty cycle (or the ERRH DC level) is maintained constant, the upper pseudo-channel 20 can produce pseudo-errors at different predetermined BERs.

The interdependence between the upper pseudo channel BER and PCLK period T can be established statistically by examining the probability of errors in the upper pseudo-channel 20. Assuming that the pseudo-errors produced are unrelated and do not come in bursts, the probability of errors in a data channel such as the upper pseudo channel 20 can be mathematically expressed based on the Poisson Distribution:

$$P_K(t) = e^{-\lambda t}\left[\frac{[\lambda t]^K}{K!}\right]$$

where $P_K(t)$ is the probability of observing K errors in a time interval t and $\lambda$ is the number of errors per second. Based on the above equation, the probability $P_0(t)$ that no errors (K=0) is observed within the same time interval t is:

$$P_0(t) = e^{-\lambda t}\left[\frac{[\lambda t]^0}{0!}\right] = e^{-\lambda t}$$

It is well known that the probability $P_{(K\geq 1)}(t)$ of observing at least one error within a time interval t can be expressed in terms of $P_0(t)$:

$$P_{(K\geq 1)}(t) = 1 - P_0(t) = 1 - e^{-\lambda t}$$

For the upper pseudo-channel 20, it can be shown that the probability $P_{(K\geq 1)}(t)$ integrated over a time period T is equal to the ERRH mean pulse width PW:

$$\int_0^T (P_{(K\geq 1)}(\tau))d\tau = \int_0^T (1 - e^{-\lambda \tau})d\tau = PW$$

where $\lambda$ is the number of pseudo-errors per second on binary ones of the incoming data signal $S_{in}(t)$. Assuming that the ERRH mean duty cycle M is maintained constant to be a fixed percentage of the PCLK period T, the ERRH mean pulse width PW can also be expressed as:

$$PW = M*T$$

where M is the ERRH mean duty cycle expressed as a percentage of the PCLK period T. Combining the last two expressions:

$$\int_0^T (1 - e^{-\lambda \tau})d\tau = M*T$$

This can be simplified by setting M to a fixed value such as for example, 50 percent and solving the integral:

$$e^{-\lambda T} = 1 - (\lambda T*0.5)$$

Solving by iteration for $\lambda T$:

$$\lambda T = 1.5944 \text{ or } \lambda = (1.5944/T)$$

Considering that the upper pseudo-channel BER can also be expressed as a function of the data rate of the incoming data signal $S_{in}(t)$ $$BER = \lambda/(S_{in}(t) \text{ data rate}/2)$$

By substituting (1.5944/T) for $\lambda$ in the above expression, the upper pseudo-channel BER can expressed as follows:

$$BER = (1.5944/T)/(S_{in}(t) \text{ data rate}/2)$$

The above result shows that there is a direct relationship between the PCLK period T and the upper pseudo-channel BER. Assuming that the $S_{in}(t)$ signal data rate in known, different BERs can be calculated for the upper pseudo-channel 20 by varying the PCLK period T.

To further illustrate this, the following table contains different BERs calculated for a 2.5 Giga bit per second (Gb/s) data signal for three different PCLK periods 1.28 mS, 128 $\mu$S and 12.8 $\mu$S. For this example, the PCLK periods are shown in a first column and the corresponding BERs are shown in a second column.

TABLE 1

| PCLK PERIOD T | CALCULATED BER |
| --- | --- |
| 1.28 mS | $1.0 * 10^{-6}$ |
| 128 $\mu$S | $1.0 * 10^{-5}$ |
| 12.8 $\mu$S | $1.0 * 10^{-4}$ |

In the upper pseudo-channel 20, when the PCLK period T is adjusted to predetermine a particular BER, the resulting change in the ERRH duty cycle causes the integrator 46 to adjust the REFH reference until the ERRH mean duty cycle M is forced back to a predetermined value (e.g. 50%). With the adjusted REFH reference, the upper pseudo-channel 20 generates pseudo-errors at the predetermined BER such that the ERRH mean duty cycle M is maintained constant. The adjusted REFH reference is then recorded in the control unit 16 to denote the predetermined BER.

The foregoing has described the manner in which BERs are predetermined in the upper pseudo-channel 20 and the manner in which the REFH reference level is adjusted to implement each predetermined BER. As noted above, this description is also directed to the manner in which BERs are predetermined in the lower pseudo-channel 24 and the manner in which the REFL reference level is adjusted to implement each predetermined BER.

Figure 6:
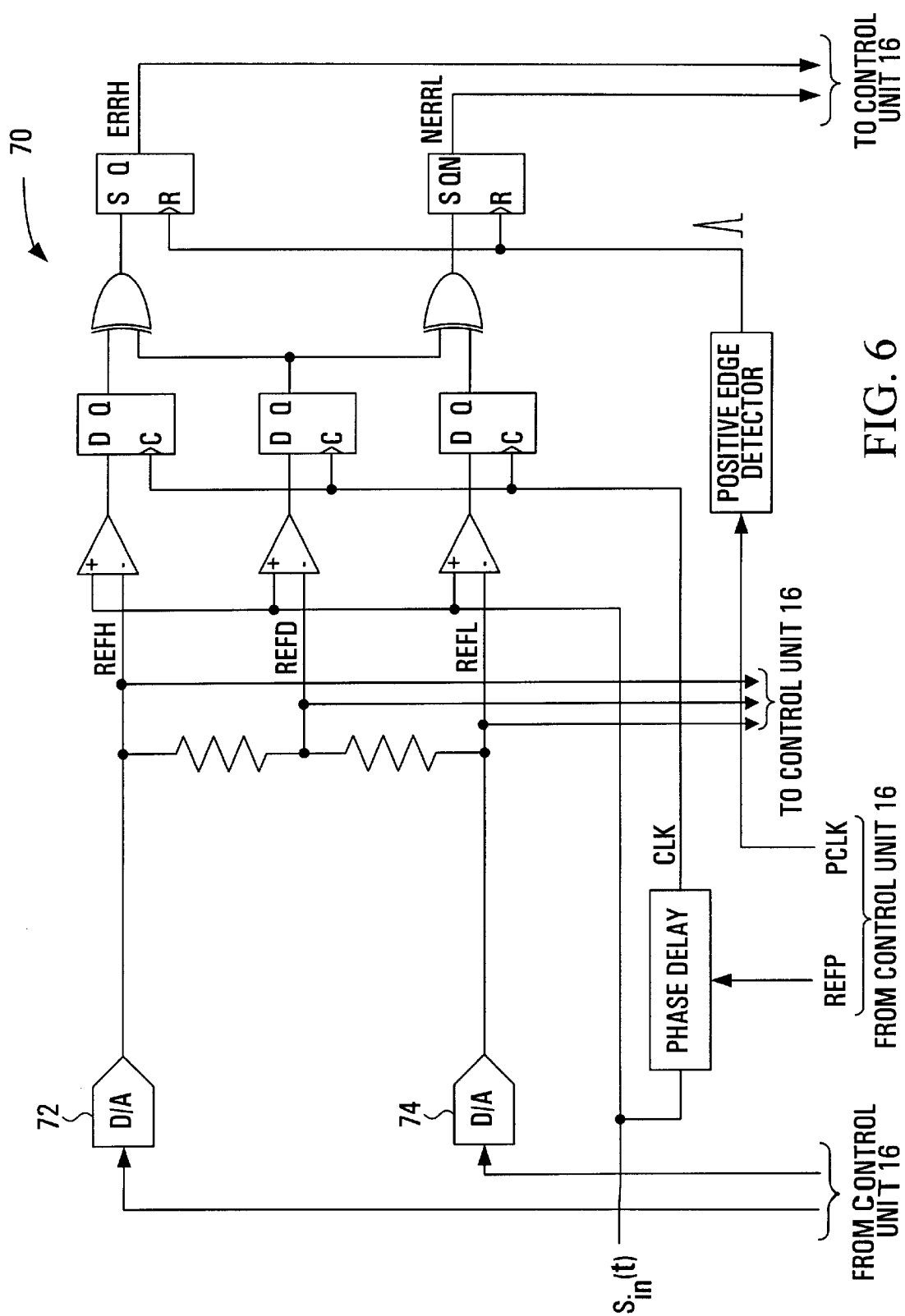
FIG. 6 is a block diagram of the monitoring unit of FIG. 2 according to another preferred embodiment of the invention.

The monitoring unit 12 described above in relation to FIGS. 2, 3, 4 and 5 is only illustrative of a particular implementation example where the REFH and REFL references are internally adjusted to produce pseudo-errors on binary ones and zeros of the incoming data signal $S_{in}(t)$ at predetermined BERs. According to the invention, alternatives are possible. For example, instead of using the integrators 46, 48 internally within the monitoring unit 12 to adjust the REFH and REFL references, the integrators 46, 48 could be external to the monitoring unit 12. In fact, the adjustment mechanism could be implemented without any integrators 46, 48 and directly into the control unit 16. As an example, FIG. 6 shows another monitoring unit 70 where the REFH and REFL references are adjusted externally by the control unit 16.

In this particular monitoring unit 70, the ERRH and NERRL signals are forwarded externally to the control unit 16 to produce the REFH and REFL references via a respective D/A converter 72, 74. In this example, with the exception of the external adjustment of the REFH and REFL references, the architecture and mode of operation of the monitoring unit 70 is identical to that of the monitoring unit 12 described above in relation to FIGS. 2, 3, 4 and 5.

Instead of using the flip-flops 42, 44 to produce the ERRH and NERRL signals to the control unit 16 and adjust the REFH and REFL references, another alternative is to use digital counters to generate counts of the pseudo-errors produced in the upper and lower pseudo-channels 20, 24. In this situation, the digital counters would be incremented each time a pseudo-error is detected and reset at the PCLK rate. An advantage of using digital counters is that the actual BER produced in the upper and lower pseudo-channel 20, 24 can be measured without any statistical determination. For example, in the upper pseudo-channel 20, the BER would be given by:

BER=counter value/PCLK period T

By monitoring the actual number of pseudo-errors generated, the REFH and REFL references can be more accurately controlled by the control unit 16 so that the upper and lower pseudo-channels 20, 24 can produce pseudo-errors at predetermined BERs.

Referring back to FIG. 2, each signal one and signal zero BER contour is obtained by varying the reference phase REFP in the control unit 16, predetermining different BERs for each reference phase REFP by varying the PCLK period T, and measuring the REFH and REFL reference levels adjusted for each predetermined BER. By measuring the adjusted REFH and REFL references for different predetermined BERs and different reference phases REFP, the control unit 16 can obtain signal one and signal zero BER contours referenced to the REFD reference and establish a BER map of the entire eye closure. Based on this BER map, the control unit 16 can determine whether the existing sampling point (REFD' and REFP') used in the regenerating unit 14 is optimally placed within the eye closure or whether it needs to be updated.

FIG. 7 shows the control unit 16 in further detail. The REFP reference phase used by the monitoring unit 12 is generated by a digital controller 90 to the monitoring unit 12 through a digital-to-analog (D/A) converter 86. The REFD reference produced by the monitoring unit 12 based on the REFH and REFL references is coupled to the digital controller 90 through an analog-to-digital (A/D) converter 80. Similarly, the REFH and REFL references produced by the monitoring unit 12 are also coupled to the digital controller 90 but through a differential A/D converter 82 for subtracting REFL from REFH first and produce a single digital signal REFH–REFL to the digital controller 90. In the digital controller 90, the REFH–REFL and REFD signals are processed to produce the reference data REFD' and reference phase REFP' to the regenerating unit 14 for optimally regenerating the incoming data signal $S_{in}(t)$.

According to the invention, there are many ways to determine an optimum sampling phase REFP'. For example, the digital controller 90 could set REFP' to a sampling phase REFP where the difference between the measured REFH and REFL reference levels is maximized.

According to the invention, there are also many ways to determine an optimum slicing threshold REFD' in the digital controller 90 based on the REFH REFL and REFD references. As an example, for a chosen REFP', the various predetermined BERs and corresponding REFH and REFL reference values obtained could be used to determine a mean level $V_1$, $V_0$ and a standard deviation $\sigma_1$, $\sigma_0$, so for binary ones and binary zeros of the incoming signal $S_{in}(t)$. According to the invention, $V_1$, $V_0$, $\sigma_1$, $\sigma_0$, could be calculated by using well-known complementary error function expressions for the upper and lower pseudo-channel BERs given as:

$$\text{Upper pseudo-channel } BER = \frac{1}{2}\text{erfc}\left[\frac{(V_1 - REFH)}{\sqrt{2}\,\sigma_1}\right]; \text{ and}$$

$$\text{Lower pseudo-channel } BER = \frac{1}{2}\text{erfc}\left[\frac{(REFL - V_0)}{\sqrt{2}\,\sigma_0}\right]$$

Based on $V_1$, $V_0$, $\sigma_1$, $\sigma_0$, the digital controller 90 could determine REFD' as follows:

$$REFD' = (V_1 - V_0)\left[\frac{\sigma_0}{\sigma_1 + \sigma_0}\right] + V_0$$

Advantageously, if $V_1$, $V_0$, $\sigma_1$, and $\sigma_0$ are calculated, other transmission parameters could be determined. For example, the transmission link Q and the optimal BER corresponding to REFD' and REFP' could be determined for by using the following expressions:

$$Q = \frac{V_1 - V_0}{\sigma_1 + \sigma_0}; \text{ and}$$

$$BER_{opt} = 0.5 * \text{erfc}\left(\frac{Q}{\sqrt{2}}\right)$$

Once a new slicing threshold REFD' and sampling phase REFP' have been determined, the control unit 16 updates the existing sampling point. As a result, the regenerating unit 14 begins to regenerate the incoming data signal $S_{in}(t)$ at the optimized sampling point (REFD' and REFP') until further optimization is carried out.

Referring now to FIG. 8 which shows the regenerating unit 14 in further detail, a data channel generally indicated by 106 and a phase delay 104 are used to regenerate the incoming data signal $S_{in}(t)$ and produce the regenerated data signal $S_{out}(t)$. Similarly to the upper and lower pseudo channels 20, 24 and the center data channel 22 of the monitoring unit 12, the data channel 106 of the regenerating unit 14 consists of a differential amplifier 100 connected in series with a D-type flip-flop 102. More specifically, the differential amplifier 100 is coupled to receive the incoming data signal $S_{in}(t)$ in a non-inverting input and the REFD' reference in an inverted input. The output of the differential amplifier 100 is coupled to a data input D of the D-type flip-flop 102. The flip-flop 102 is also coupled to receive in a clock input C a sampling clock signal CLK' which is recovered from the incoming signal $S_{in}(t)$ through the phase delay 104. The phase delay 104 re-times the recovered sampling clock signal CLK' by introducing a delay which corresponds to REFP' reference supplied by the control unit 16.

In operation, the regenerating unit 14 optimally regenerates the incoming data signal $S_{in}(t)$ by using the slicing threshold REFD' and the sampling phase REFP'. With the REFD' and REFP' references produced by the control unit 16 and not directly by the monitoring unit 12, the regenerating unit 14 can regenerate the incoming data without any disruption from the monitoring process. While the incoming data signal $S_{in}(t)$ is regenerated, the monitoring unit 12 is free to perform BER measurements on the incoming data signal $S_{in}(t)$ as described above so that the control unit 16 can fully monitor the data eye closure without interrupting regeneration and introducing errors in the regenerated data.

Although embodiments of the invention have been described above, it is not limited thereto and it will be apparent to those skilled in the art that numerous modifications form part of the present invention insofar as they do not depart from the spirit, nature and scope of the claimed and described invention.

The invention has been described above in relation to a particular data regenerator implementation. It is to be understood that regenerating signals, the invention is not limited to data regenerator implementations and can also be incorporated directly into any network terminal or receiver where an incoming signal is to be regenerated.

Further, the monitoring unit has been described above as being used to optimize both a data slicing threshold REFD' and sampling phase REFP' which together define an optimal sampling point for data regeneration. In some situations, it may be desirable limit the optimization to the data slicing threshold REFD' while maintaining the data sampling phase REFP' fixed (or predetermined). In these situations, it is to be understood that the invention could alternatively be used to optimize only the data slicing threshold REFD' without optimizing the data sampling phase REFP'. For this, the reference sampling phase REFP supplied to the monitoring unit would be maintained fixed while the PCLK clock signal would be varied to predetermine different BERs in the monitoring unit and determine an optimal data slicing threshold REFD'.

Conversely, the invention could also be used to optimize the optimal data sampling phase REFP' for a fixed (or predetermined) data slicing threshold REFD'. In this situation, the PCLK clock signal would be maintained constant to implement the fixed (or predetermined) BER in the monitoring unit and the reference sampling phase REFP would be varied to determine an optimal data sampling phase REFP'.

We claim:

1. A method of regenerating an incoming data signal in a receiver at an optimized sampling point to produce an optimally regenerated data signal, the method comprising continuously:

regenerating in a regenerating unit the incoming data signal at a sampling point to produce a regenerated data signal;

regenerating in a monitoring unit the incoming data signal at different reference sampling points to produce a first pseudo regenerated data signal with pseudo-errors at different bit error rates (BERs) for establishing a BER map of the incoming data signal;

determining based on the BER map established whether the sampling point is optimal;

if the sampling point is not optimal, determining an optimal sampling point and applying the optimal sampling point determined in the regenerating unit to regenerate the incoming data signal optimally for producing the optimally regenerated data signal.

2. The method of claim 1 wherein the sampling point consists of a slicing threshold and a sampling phase and the optimal sampling point consists of an optimal slicing threshold and an optimal sampling phase.

3. The method of claim 1 wherein the sampling point consists of a slicing threshold and the optimal sampling point consists of an optimal slicing threshold.

4. The method of claim 2 wherein regenerating in a monitoring unit the incoming data signal at different reference sampling points to produce a first pseudo regenerated data signal with pseudo-errors at different BERs for establishing a BER map of the incoming data signal comprises:

a) recovering a clock signal from the incoming data signal;

b) predetermining a BER;

c) selecting a reference sampling phase;

d) phase delaying the recovered clock signal with the reference sampling phase selected to produce a phase delayed clock signal;

e) regenerating the incoming data signal using the reference sampling phase selected and a first reference slicing threshold to produce the first pseudo regenerated data signal with pseudo-errors;

f) adjusting the first reference slicing threshold to produce pseudo-errors in the first pseudo regenerated data signal at the predetermined BER;

g) recording the first reference slicing threshold adjusted and the selected reference sampling phase to denote the predetermined BER;

h) repeating the steps (c) to (g) for a plurality of reference sampling phases to establish a BER contour; and i) repeating the steps (b) to (g) for a plurality of predetermined BERs to obtain a plurality of BER contours and establish the BER map.

5. The method of claim 4 wherein the first reference slicing threshold is used to produce pseudo-errors in the first pseudo regenerated data signal on binary ones of the incoming data signal and wherein establishing a BER map of the incoming data signal further comprises:

j) regenerating the incoming data signal using the reference sampling phase selected and a second reference slicing threshold to produce a second pseudo regenerated data signal with pseudo-errors on binary zeros of the incoming data signal;

k) adjusting the second reference slicing threshold to produce pseudo-errors in the second pseudo regenerated data signal at the predetermined BER;

l) recording the second reference slicing threshold adjusted and the reference sampling phase selected to denote the predetermined BER;

m) repeating the steps (c), (d) and (j) to (l) for a plurality of reference sampling phases to establish a signal zero BER contour; and n) repeating the steps (b), (c), (d) and (j to (l) for a plurality of predetermined BERs to obtain a plurality of signal zero BER contours and establish the BER map.

6. The method of claim 5 wherein establishing a BER map of the incoming data signal further comprises:

o) setting a third reference slicing threshold in dependence to the first and second reference slicing thresholds; and p) regenerating the incoming data signal using the reference sampling phase selected and the third reference slicing threshold to provide a reference in producing pseudo-errors on binary ones of the incoming data signal in the first pseudo regenerated data signal and in producing pseudo-errors on binary zeros of the incoming data signal in the second pseudo regenerated data signal.

7. The method of claim 6 wherein determining an optimal sampling point comprises:

for each sampling phase, calculating a signal one mean level for binary ones of the incoming data signal and a signal zero mean level for binary zeros of the incoming data signal based on the adjusted first and second reference slicing thresholds recorded;

for each sampling phase, calculating a difference between the signal one and signal zero mean levels; and determining a slicing threshold and sampling phase for which the calculated difference between the signal one and signal zero mean levels is maximized to produce the optimal sampling point.

8. An apparatus for regenerating an incoming data signal in a receiver at an optimized sampling point to produce an optimally regenerated data signal, the apparatus comprising:

a regenerating unit connected to receive the incoming data signal and operable to regenerate the incoming data signal at a sampling point to produce a regenerated data signal;

a monitoring unit connected to receive the incoming data signal and operable to regenerate the incoming data signal at different reference sampling points for producing a first pseudo regenerated data signal with pseudo-errors at different bit error rates (BERs) for establishing a BER map of the incoming data signal;

a control unit operable to determine based on the BER map established whether the sampling point is optimal, and if the sampling point is not optimal, the control unit being operable to determine an optimal sampling point and applying the optimal sampling point determined in the regenerating unit to regenerate the incoming data signal optimally and produce the optimally regenerated data signal.

9. The apparatus of claim 8 wherein the sampling point consists of a slicing threshold and a sampling phase and the optimal sampling point consists of an optimal slicing threshold and an optimal sampling phase.

10. The apparatus of claim 8 wherein the sampling point consists of a slicing threshold and the optimal sampling point consists of an optimal slicing threshold.

11. The apparatus of claim 9 wherein for regenerating the incoming data signal optimally and producing the optimally regenerated data signal, the monitoring unit and the regenerating unit are controlled by the control unit in a master-slave arrangement.

12. The apparatus of claim 11 wherein to regenerate the incoming data signal at different reference sampling points for producing a first pseudo regenerated data signal with pseudo-errors at different bit error rates (BERs), the monitoring unit comprises:

a first phase delay connected to receive the incoming data signal for recovering a clock signal therefrom, the first phase delay being also operative to delay the recovered clock signal using different reference sample phases for producing a phase delayed clock signal;

a first pseudo data channel connected to receive the phase delayed clock signal, the incoming data signal and a first reference slicing threshold signal representative of a first reference slicing threshold, the first pseudo data channel being operable to regenerate the incoming data signal based on the phase delayed clock signal and the first reference slicing threshold signal for producing the first pseudo regenerated data signal;

a first control loop connected to receive the first pseudo regenerated data signal and produce the first reference slicing threshold signal such that the first pseudo data channel produces pseudo-errors in the pseudo regenerated data signal at different BERs.

13. The apparatus of claim 12 wherein for establishing a BER map of the incoming data signal eye closure, the monitoring unit is controlled by the control unit wherein the control unit is operable to predetermine a plurality of BERs and provide a reference sample phase signal to delay the recovered clock signal using a plurality of reference sample phases.

14. The apparatus of claim 13 wherein for each particular BER predetermined and reference sample phase used, the control unit records the first reference slicing threshold signal adjusted in the monitoring unit together with the associated reference sample phase used to denote the corresponding predetermined BER.

15. The apparatus of claim 14 wherein the first reference slicing threshold is used in the first pseudo data channel to produce pseudo-errors in the first pseudo regenerated data signal on binary ones of the incoming data signal at predetermined BERs, and wherein for establishing a BER map of the incoming data signal, the monitoring unit further comprises:

a second pseudo data channel connected to receive the phase delayed clock signal, the incoming data signal and a second reference slicing threshold signal representative of a second reference slicing threshold, the second pseudo data channel being operable to regenerate the incoming data signal based on the phase delayed clock signal and the second reference slicing threshold signal for producing a second pseudo regenerated data signal;

a second control loop connected to receive the second pseudo regenerated data signal and produce the second reference slicing threshold signal such that the second pseudo data channel produces pseudo-errors in the second regenerated output signal on binary zeros of the incoming data signal at predetermined BERs.

16. The apparatus of claim 15 wherein the first and second pseudo data channels respectively comprise:

a first and second comparator connected to receive the incoming data signal and respectively the first and second reference slicing threshold signals, the first and second comparators being operable to compare the incoming data signal to the corresponding first and second reference slicing thresholds for producing a corresponding first and second comparator output signal; and a first and second latch connected to receive the phase delayed clock signal and respectively the first and second comparator output signals for producing the first and second pseudo regenerated data signals.

17. The apparatus of claim 16 wherein the first and second comparators are differential amplifiers.

18. The apparatus of claim 16 wherein the first and second latches are D-type flip-flops.

19. The apparatus of claim 16 wherein the first and second control loops respectively comprise:

a first and second gate respectively connected to receive the first and second pseudo regenerated data signals for detecting the pseudo-errors carried therein and generate a first and second gate output signal;

a first and second pulse stretching unit respectively connected to the first and second gates and operable to reset the first and second gate output signals at predetermined clock rates of a control clock signal each corresponding to a particular predetermined BER for producing a first and second error signal; and a first and second integrating unit respectively connected to the first and second pulse stretching units and operable to integrate the first and second error signals respectively for producing the first and second reference slicing threshold signals.

20. The apparatus of claim 19 wherein the control clock signal is generated by the control unit for predetermining BERs in each of the first and second control loops.

21. The apparatus of claim 19 wherein the first and second gates are exclusive-OR gates.

22. The apparatus of claim 19 wherein the first and second pulse stretching units are D-type flip-flops.

23. The apparatus of claim 19 wherein the first and second pulse stretching units are digital counters.

24. The apparatus of claim 19 wherein the first and second integrating units each comprises a series resistor, a differential amplifier and a feedback capacitor.

25. The apparatus of claim 19 wherein the first and second control loops are implemented in the control unit.

26. The apparatus of claim 15 wherein the monitoring further comprises a third pseudo data channel connected to receive the incoming data signal, the phase delayed clock signal and a third reference slicing threshold signal representative of a third reference slicing threshold, the third pseudo data channel being operable to regenerate the incoming data signal based on the phase delayed clock signal and the third reference slicing threshold signal for producing a third pseudo regenerated data signal, and wherein the third pseudo regenerated data signal produced is used in the first and second gates as a reference to detect pseudo-errors present in the first and second pseudo regenerated data signals for generating the first and second gate output signals.

27. The apparatus of claim 26 wherein the third pseudo data channel comprises:

a third comparator connected to receive the incoming data signal and the third reference slicing threshold signal, the third comparator being operable to compare the incoming data signal to the third reference slicing threshold for producing a third comparator output signal; and a third latch connected to receive the phase delayed clock signal and the third comparator output signal for producing the third pseudo regenerated data signal.

28. The apparatus of claim 27 wherein the first, second and third comparators are differential amplifiers.

29. The apparatus of claim 27 wherein the first, second and third latches are D-type flip-flops.

30. The apparatus of claim 27 wherein the monitoring unit further comprises a voltage dividor connected to receive the first and second reference slicing threshold signals to produce the third reference slicing threshold signal and set the third reference slicing threshold in dependence to the first and second reference slicing thresholds.

31. The apparatus of claim 8 wherein the regenerating unit comprises:

another phase delay connected to receive the sampling phase signal and the incoming data signal for recovering another clock signal therefrom, the other phase delay being also operative to delay the other recovered clock signal in reference to the optimized sampling phase for producing another phase delayed clock signal;

a data channel connected to receive the other phase delayed clock signal and the incoming data signal, the data channel being operable to regenerate the incoming data signal based on the optimized sampling phase and the optimized slicing threshold for producing the optimally regenerated data signal.

32. The apparatus of claim 31 wherein the data channel comprises:

a fourth comparator connected to receive the incoming data signal and the slicing threshold signal, the third comparator being operable to compare the incoming data signal to the optimized slicing threshold for producing a fourth comparator output signal; and a fourth latch connected to receive the other phase delayed clock signal and the fourth comparator output signal for producing for producing the optimally regenerated data signal.

33. The apparatus of claim 32 wherein the fourth comparator is a differential amplifier.

34. The apparatus of claim 32 wherein the fourth latch is a D-type flip-flop.

* * * * *